(12) United States Patent
Takao et al.

(10) Patent No.: US 7,475,909 B2
(45) Date of Patent: Jan. 13, 2009

(54) SEAT BELT APPARATUS

(75) Inventors: Masato Takao, Hikone (JP); Yasuaki Nomura, Ibaragi (JP)

(73) Assignee: Takata Corporation, Tokyo (JP)

( * ) Notice: Subject to any disclaimer, the term of this patent is extended or adjusted under 35 U.S.C. 154(b) by 448 days.

(21) Appl. No.: 11/274,253

(22) Filed: Nov. 16, 2005

(65) Prior Publication Data
US 2006/0119091 A1 Jun. 8, 2006

(30) Foreign Application Priority Data
Dec. 6, 2004 (JP) ............................. 2004-353152

(51) Int. Cl.
B60R 22/20 (2006.01)
(52) U.S. Cl. ................................. 280/801.2
(58) Field of Classification Search ............. 280/801.2, 280/804; 180/268; 297/473, 481
See application file for complete search history.

(56) References Cited

U.S. PATENT DOCUMENTS

| 4,231,592 | A | * | 11/1980 | Scherenberg et al. | ....... | 280/808 |
| 5,123,673 | A | * | 6/1992 | Tame | ....................... | 280/801.1 |
| 5,626,359 | A | * | 5/1997 | Steffens et al. | ............... | 280/735 |
| 6,279,954 | B1 | * | 8/2001 | Townsend et al. | ........ | 280/801.1 |
| 6,308,986 | B1 | * | 10/2001 | Townsend et al. | ........... | 280/807 |
| 6,467,849 | B1 | * | 10/2002 | Deptolla | ..................... | 297/464 |
| 6,485,058 | B1 | * | 11/2002 | Kohlndorfer et al. | ........ | 280/808 |
| 6,550,867 | B2 | * | 4/2003 | Rogers et al. | ................ | 297/468 |
| 6,883,834 | B2 | * | 4/2005 | Grabowski et al. | ........ | 280/801.2 |
| 6,908,112 | B2 | * | 6/2005 | Yano et al. | .................... | 280/805 |
| 7,308,349 | B2 | * | 12/2007 | Kong et al. | ..................... | 701/45 |
| 2001/0037907 | A1 | * | 11/2001 | Peter et al. | .................... | 180/268 |
| 2002/0043872 | A1 | * | 4/2002 | Townsend et al. | ........... | 297/473 |
| 2003/0075914 | A1 | * | 4/2003 | Kohlndorfer et al. | ........ | 280/808 |
| 2004/0155136 | A1 | * | 8/2004 | Yano et al. | .................... | 242/383 |
| 2004/0217583 | A1 | * | 11/2004 | Wang | .......................... | 280/805 |
| 2006/0113785 | A1 | * | 6/2006 | Sugiyama et al. | ......... | 280/801.1 |
| 2006/0181073 | A1 | * | 8/2006 | Sugiyama et al. | ......... | 280/801.1 |

FOREIGN PATENT DOCUMENTS

| DE | 100 143 025 A1 | 4/2001 |
| EP | 0 716 963 A1 | 6/1996 |
| GB | 1 570 459 | 7/1980 |
| GB | 2 123 269 A | 2/1984 |
| JP | 2004-148916 | 5/2004 |

* cited by examiner

Primary Examiner—Paul N. Dickson
Assistant Examiner—Barry Gooden, Jr.
(74) Attorney, Agent, or Firm—Foley & Lardner LLP

(57) ABSTRACT

A seat belt apparatus for a vehicle that allows a vehicle passenger to smoothly get in or out of the vehicle. The seat belt apparatus may be mounted in a vehicle, so that with a turning operation of a turning member, a seat belt front-end of an overall seat belt, that is fixed to the turning member of an out-anchor apparatus, is set at a first setting position close to a vehicle passenger upon wearing the seat belt and at a second setting position remote from the vehicle passenger upon retracting the seat belt.

20 Claims, 8 Drawing Sheets

SEAT BELT APPARATUS

BACKGROUND

The present invention relates to a construction technique of a seat belt apparatus mounted on a vehicle.

A known seat belt apparatus has a structure in which a vehicle passenger is protected by a seat belt (a webbing) for constraining the vehicle passenger. For example, Japanese Unexamined Patent Application Publication 2004-148916 (incorporated by reference herein) discloses a seat belt apparatus having a structure in which a guiding means for a seat belt is provided at an upper position of a B-pillar (a center pillar) of a vehicle. The guiding means has a structure in which a portion in which the seat belt withdrawn from a retractor (a webbing retracting apparatus) upwards along the center pillar is deflected at the upper position of the center pillar. That is, a portion of the seat belt in the vicinity of the shoulder or the head of the passenger is arranged so as to be detachably movable to or from the vehicle passenger sitting in a seat.

The technique stated in Japanese Unexamined Patent Application Publication 2004-148916 presents a feasible way of allowing the vehicle passenger to smoothly get in or out a vehicle by arranging the seat belt so as to be detachably movable to or from the vehicle passenger sitting in the seat, where the structure in which a structural body, such as the guiding means disposed at the upper position of the center pillar, is driven to allow a portion of the seat belt in the vicinity of the shoulder or the head of the passenger to be detachably movable. However, this technique is limited in how it allows a vehicle passenger to smoothly get in or out of the vehicle and is disadvantaged in achieving a constraint of the passenger when the seat belt is worn. Moreover, the technique does not improve design features in the vehicle compartment.

Accordingly, the present invention has been made in view of the above problems and has an object to provide an effective technique of a seat belt apparatus mounted on a vehicle, for allowing a vehicle passenger to smoothly get in or out of a vehicle.

SUMMARY OF THE INVENTION

The present invention is formed in order to solve the above-described problems. While being typically applicable to a seat belt apparatus mounted on an automobile, the present invention is also applicable to a construction technique of a seat belt apparatus mounted on vehicles other than an automobile if needed.

According to an embodiment of the present invention, a seat belt apparatus includes a seat belt to be worn by a vehicle passenger sitting in a seat, a seat belt retractor for retracting and winding off the seat belt, a guide member guiding the seat belt wound off from the seat belt retractor so as to be deflected downwards in an upper region in a vehicle, located higher than the seat belt retractor, an anchor member fixing a front-end of the seat belt that is guided by the guide member to a vehicle body side in a lower region in the vehicle, located lower than a seating surface of the seat, and a driving device for moving the seat belt front-end between a first setting position close to the vehicle passenger and a second setting position remote from the vehicle passenger, wherein, when the seat belt is worn, the seat belt front-end is set at the first setting position by the driving device, and when the seatbelt is stored, the seat belt front-end is set at the second setting position by the driving device.

According to an embodiment of the present invention, a seat belt apparatus includes a seat belt to be worn by a vehicle passenger sitting in a seat, a seat belt retractor for retracting and winding off the seat belt, an anchor member fixing a first end of the seat belt to a vehicle body side in a lower region in the vehicle, located lower than a seating surface of the seat, and a driving device for moving the seat belt first end between a first setting position close to the vehicle passenger and a second setting position remote from the vehicle passenger, wherein, when the seat belt is worn, the seat belt first end is set at the first setting position by the driving device, and when the seatbelt is stored, the seat belt first end is set at the second setting position by the driving device.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
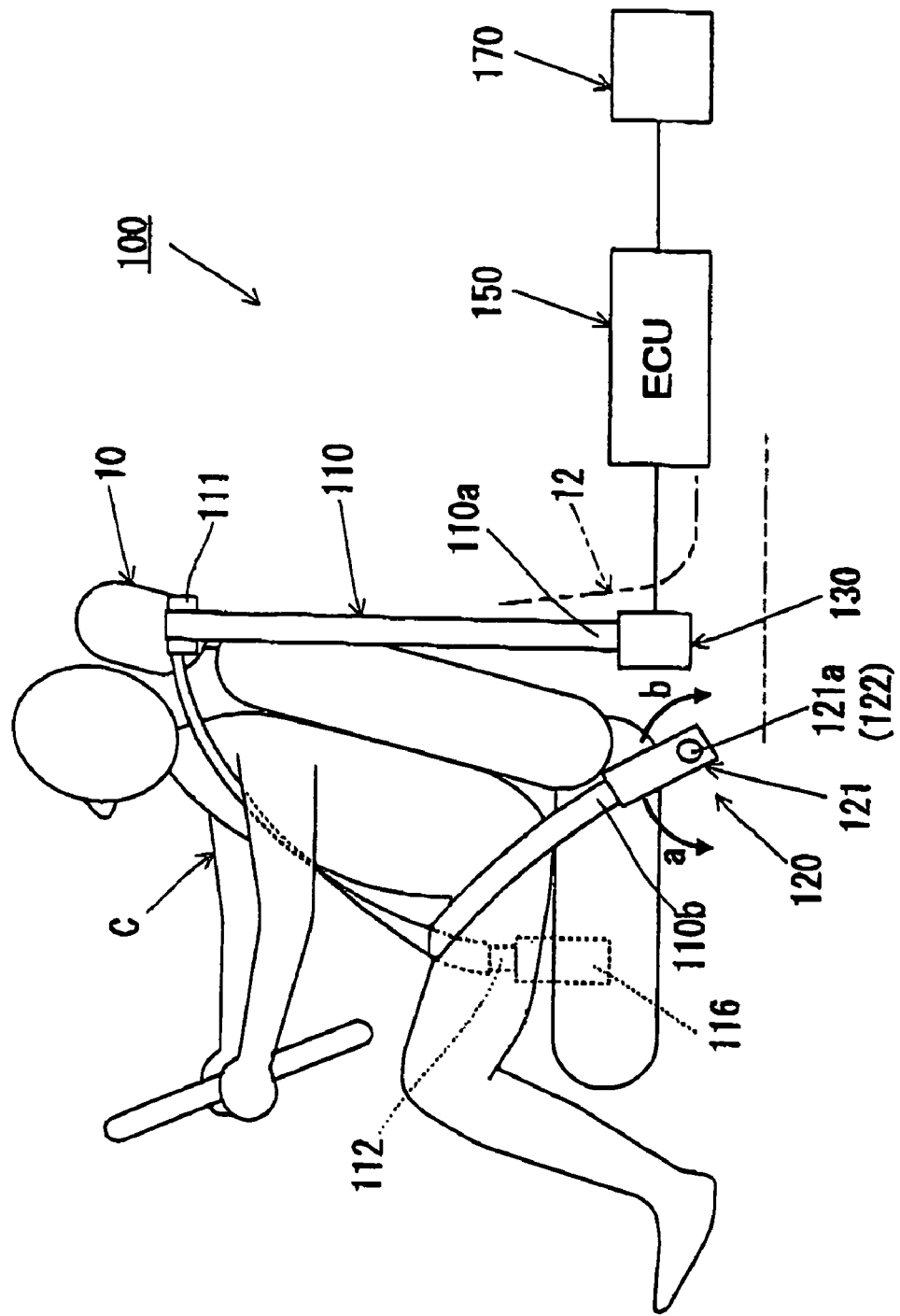
FIG. 1 is a diagrammatic view of the structure of a vehicle-mounting seat belt apparatus including a retractor according to an embodiment of the resent invention.
Figure 2:
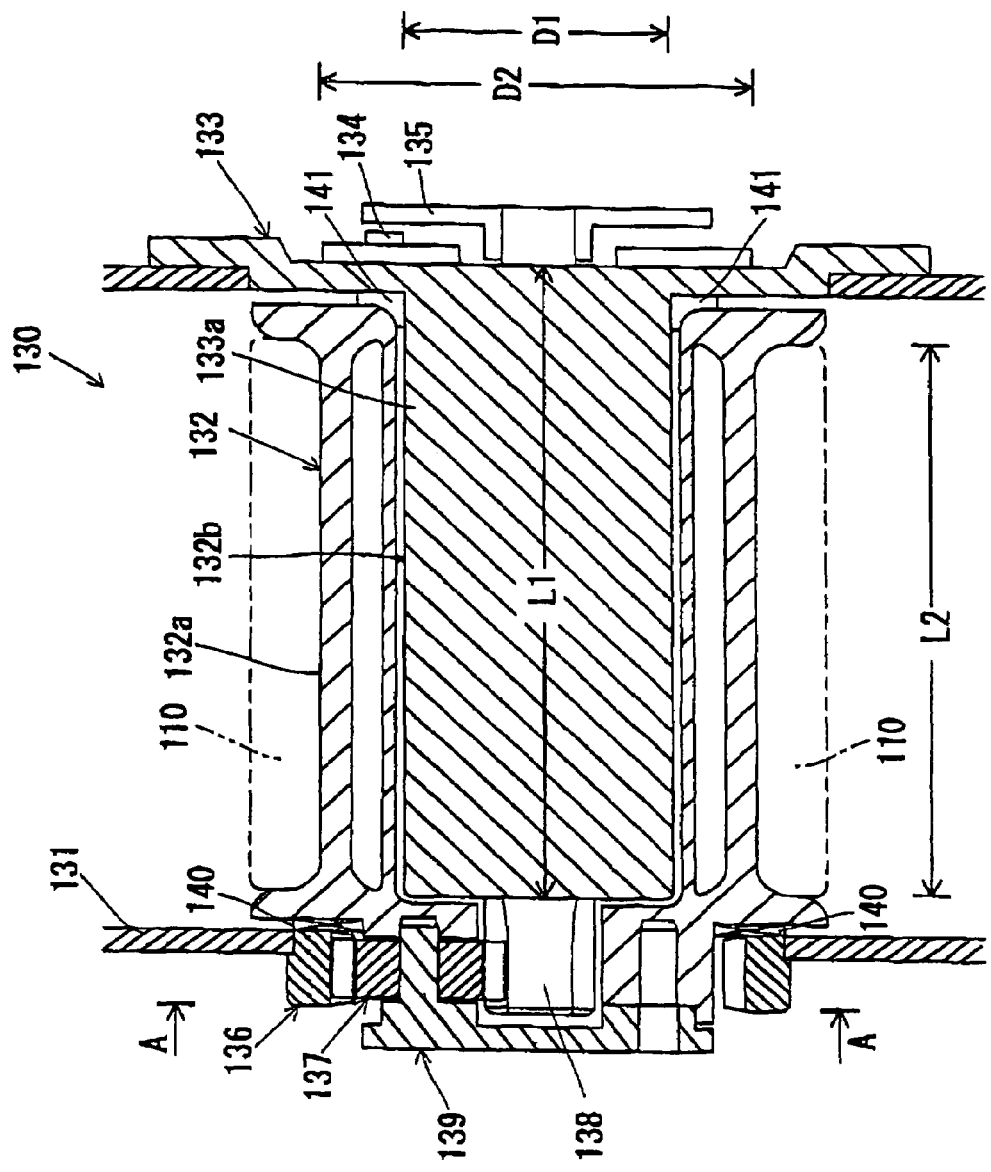
FIG. 2 illustrates a sectional structure of the retractor shown in FIG. 1.
Figure 3:
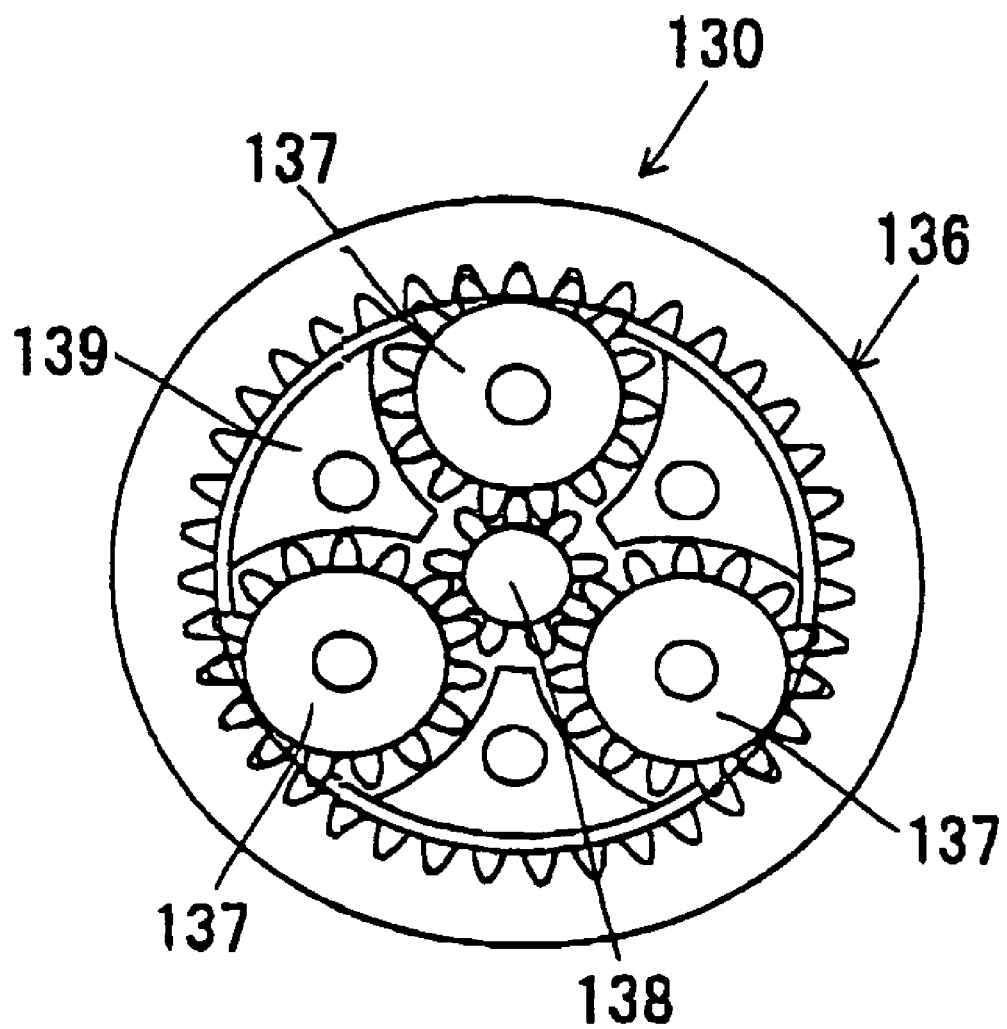
FIG. 3 is a sectional view on arrow, cut away along line A-A, of the retractor shown in FIG. 2.

Embodiments of the present invention will be described in detail with reference to the accompanying drawings. Referring first to FIG. 1 through FIG. 3, the structure of a seat belt apparatus 100 according to one embodiment of the present invention will be described.

The seat belt according to the present invention is a long shaped belt, worn by a vehicle passenger sitting in a seat and is also called a "webbing". Typically, during constraining a passenger against a vehicle collision or the like, the vehicle passenger sitting in a vehicle seat is constrained by the seat belt, thereby ensuring the protection thereof.

The seat belt retractor according to the present invention has a function of retracting and winding off the seat belt.

The guide member according to the present invention has a structure in which the seat belt wound off from the seat belt retractor is guided so as to be deflected downwards in an upper region in a vehicle, located higher than the seat belt retractor.

The anchor member according to the present invention has a function of fixing a seat belt front-end of the seat belt guided by the guide member to a vehicle body side in a lower region in the vehicle, located lower than the seating surface of the seat.

The driving means according to the present invention is a means allowing the seat belt front-end to move between a first setting position close to the vehicle passenger and a second setting position remote from the vehicle passenger. In this case, while the moving direction of the seat belt front-end can be set as appropriate if needed, the seat belt front-end is typically allowed to move along the back and forth direction of the vehicle.

According to the present aspect of the present invention, the seat belt front-end can be set at least at the first and second setting positions. When the seat belt is worn, the seat belt front-end is set at the first setting position by the driving means. Also, when the seat belt is stored, the seat belt front-end is set at the second setting position by the driving means.

With the structure of the seat belt apparatus according to the present aspect of the present invention as described above, when the seat belt is worn, the seat belt front-end is set at the first setting position close to the vehicle passenger, in which the vehicle passenger can easily grasp the seat belt and a tongue. This helps with the wearing operation of the seat belt, thereby reducing a load and simplifying an operation for withdrawing the seat belt. Also, when the seat belt is stored, since the seat belt front-end is set at the second setting position remote from the vehicle passenger, in which the seat belt is smoothly stored, thereby reducing a load and an operation when the seat belt is stored and allowing the vehicle passenger to easily get in or out of the vehicle.

Also, according to the present aspect of the present invention, the structure allowing the seat belt front-end close to the anchor member to move eliminates a need for disposing a driving mechanism at an upper position of a B-pillar (a center pillar) and does not require the seat belt to move at the upper position of the B-pillar, thereby achieving constraint of the passenger when the seat belt is worn and improving a design feature in the vehicle compartment.

As described above, according to the present invention, in the seat belt apparatus mounted on a vehicle, with the structure in which the seat belt front-end, close to the anchor member, of the overall seat belt, is set at the first setting position close to the vehicle passenger when the seat belt is worn and at the second setting position remote from the vehicle passenger when the seat belt is stored, the vehicle passenger can smoothly get in or out of the vehicle.

FIG. 1 is a diagrammatic view of the structure of a vehicle-mounting seat belt apparatus 100 according to the present embodiment.

As shown in FIG. 1, a seat belt apparatus 100 according to the present embodiment is a vehicle-use seat belt apparatus mounted in an automobile and mainly includes a seat belt 110, an out-anchor apparatus 120, a retractor 130, and an ECU 150. Also, the vehicle has an input element 170 mounted thereon, for detecting a variety of information, such as information about a collision prediction and an occurrence of a vehicle collision, information about a driving state of the vehicle, information about a seating position and a body size of a vehicle passenger sitting in a seat, information about traffic conditions around the vehicle, and information about current weather and time zone, and for inputting the detected information to the ECU 150. The detected information of the input element 170 is transferred continuously or transferred at a predetermined time interval to the ECU 150 for controlling operations of the seat belt apparatus 100 and so forth.

The seat belt 110 is a long-shaped belt (a webbing) used for constraining a vehicle passenger C sitting in a front vehicle seat 10 serving as a driver seat (corresponding to the "seat" and the "front seat" in the present invention) or releasing the vehicle passenger from the constraint. The seat belt 110 is withdrawn from the retractor 130 fixed to the vehicle, extends through a deflection fitting 111 (is deflected at the deflection fitting 111) disposed in a passenger's shoulder region of the vehicle passenger C, passes through a tongue 112, and is connected to the out-anchor apparatus 120. The deflection fitting 111 retains and guides the seat belt 110 extending in the passenger's shoulder or head region of the vehicle passenger C. The deflection fitting 111 serves as a member for folding back the seat belt 110 wound off from the retractor 130 in an upper region in the vehicle, located higher than the retractor 130 and for guiding it downwards. The deflection fitting 111 corresponds to the "guide member" in the present invention. When the tongue 112 is inserted into a buckle 116 fixed to the vehicle body, the seat belt 110 extends long from a base end 110a thereof close to the retractor 130 to a front end 110b thereof close to the out-anchor apparatus 120, thereby fastened by the vehicle passenger C. When the seat belt 110 is worn by the vehicle passenger C, the breast, lower abdomen, waist and so forth of the vehicle passenger C are constrained by the seat belt 110. The seat belt 110 corresponds to the "seat belt" in the present invention.

The seat belt front-end 110b of the seat belt 110 withdrawn from the retractor 130 is fixed to the vehicle body by the out-anchor apparatus 120 disposed lower than the seating surface of the vehicle seat 10. Also, the out-anchor apparatus 120 includes a turning member 121 and a twisted spring (a twisted coil spring) 122. The turning member 121 has a function of fixing the seat belt front-end 110b in a lower region in the vehicle, located lower than the seating surface of the vehicle seat 10 and corresponds to the "anchor member" in the present invention. Also, the turning member 121 may be formed so as to turn frontward in relation to the vehicle (indicated by the direction of arrow a in FIG. 1) and rearward in relation to the vehicle (indicated by the direction of arrow b in FIG. 1), about a turning fulcrum 121a fixed to the vehicle body, and is elastically urged frontward of the vehicle (arrow a direction in FIG. 1) by the twisted spring 122. The twisted spring 122 urges the turning member 121 frontward of the vehicle and constitutes the "urging means" in the present of the invention.

The retractor 130 serves as an apparatus for retracting and winding off the seat belt 110 via a spool 132, which will be described later, and corresponds to the "seat belt retractor" in the present invention. In the example shown in FIG. 1, with respect to the back and forth direction of the vehicle, the retractor 130 is placed in an accommodation space of the lower region in the vehicle, located within the B-pillar 12 that is disposed between the front vehicle seat 10 and a rear vehicle seat 14.

The ECU 150 may have the function of controlling a variety of operational mechanisms including the retractor 130 on the basis of input signals from the input element 170 and includes a CPU (a processing unit), an input-output apparatus, a storage, and a peripheral. Especially, in the description of the present embodiment, the ECU 150 controls a motor 133 of the retractor 130, which will be described later. To be more specific, by controlling an amount of electric current and the feeding direction of the electric current fed to an electromagnetic coil of the motor 133, the ECU 150 varies the rotating speed and the direction of the motor shaft.

Referring now to FIGS. 2 and 3, the detailed structure of the retractor 130 will be described. FIG. 2 illustrates a sectional structure of the retractor 130 shown in FIG. 1, and FIG. 3 is a sectional view on arrow along the line A-A, of the retractor 130 shown in FIG. 2.

As shown in FIG. 2, the retractor 130 according to the present embodiment may have a structure in which a base frame (a retractor body frame) 131 fixed to the vehicle body has a spool (a retracting shaft) 132, a motor 133, a hall sensor 134, a magnetic disc 135, an internal gear 136, planetary gears 137, a sun gear 138, a carrier 139, and bearings 140 and 141 placed inside thereof. The retractor 130 is formed as a motor built-in retractor having the motor 133 built in the base frame 131.

The spool 132 of the retractor 130 may be a member rotatably supported relative to the base frame 131. To be specific, the bearing 140 is interposed between the internal gear 136 serving as a fixed member and the spool 132, and the bearing 141 is interposed between the main body of the motor 133 serving as another fixed body and the spool 132, whereby the spool 132 may be rotated relative to the fixed members. That is, the spool 132 and a motor housing 133a of the motor 133 are rotatably supported by each other via the bearing mechanism (the bearing 140) interposed between the external side surface of the spool and the internal side surface of the internal gear and via the other bearing mechanism (the bearing 141) interposed between the internal peripheral surface of the spool and the external peripheral surface of the motor housing. With this structure, a rotation of the spool 132 relative to the motor housing 133a is achieved with a simple bearing structure.

With the retractor 130, the seat belt 110 may be retracted around a spool outer periphery 132a of the spool 132 or wound off from the spool outer periphery 132a of the spool 132. That is, the spool outer periphery 132a of the spool 132 is a surface with which the seat belt 110 is in contact. When the motor shaft of the motor 133 rotates in one direction, the seat belt 110 is wound off from the spool 132, and when rotating in the other direction, the seat belt 110 is retracted around the spool 132. Details of the motor will be described later.

With the structure according to the present embodiment, in which the spool 132 is rotated by the motor 133, a spring mechanism for urging the spool 132 in a seat belt retracting direction can be eliminated. Since the spring mechanism is generally disposed next to the spool along the spool width direction of the spool 132, elimination of the spring mechanism reduces the size of the spool 132 in the width direction and further reduces the over all size of the retractor 130.

The spool 132 has a cylindrical shape, having a bottom at one end and an opening at the other end, and a hollow space 132b in the cylinder, in which the motor 133 is inserted through the opening and accommodated (built). In the state in which the motor 133 is accommodated in the hollow space 132b in the spool 132, the motor housing 133a of the motor 133 extends along the width direction of the spool outer periphery 132a of the spool 132 such that the axial direction of the motor 133 coincides with the width direction of the spool outer periphery 132a.

In the state that the motor 133 is accommodated, three dimensions, i.e., the size L1 of the motor housing 133a of the motor 133 in the axial direction, the size L2 of the spool outer periphery 132a of the spool 132 in the width direction, and the width of the seat belt 110, are broadly equal to each other. That is, in this embodiment, the size of the motor housing 133a in the axial direction and the size of the spool outer periphery 132a are set so as to meet the standard width of the seat belt 110. Also, as shown in FIG. 2, in this embodiment, the overall size of the spool 132 in the width direction is nearly equal to the size of the spool outer periphery 132a in the width direction. That is, the four dimensions, i.e. the overall size of the spool 132 in the width direction, the size L1 of the motor housing 133a in the axial direction, the size L2 of the spool outer periphery 132a in the width direction, and the width of the seat belt 110 are broadly equal to each other.

According to such a structure, the width of the spool 132 can be reduced to correspond to the size of the motor housing 133a in the axial direction, thereby reducing the overall size relating to the axial direction of the retractor 130. Therefore, the miniaturization of the retractor 130 and the seat belt apparatus 100 to be installed in the vehicle is achieved, thereby increasing the degree of freedom of location of the seat belt retractor 130 and the seat belt apparatus 100 in the vehicle. The motor housing 133a may be designed to have the maximum size in the axial direction within the range of the width of the spool 132, allowing the use of a motor with higher output.

Also, with the design of the motor 133 being accommodated in the cylindrical space of the spool 132, as described in the present embodiment, the size and weight of the retractor 130 can be reduced, and in addition, a noise insulation and an electromagnetic-wave shielding upon driving the motor can be improved.

Also, in the present embodiment, the ratio D1/D2 of the outside diameter D1 of the motor housing 133a of the motor 133 to the outside diameter D2 of the spool outer periphery 132a of the spool 132 may preferably be set at 0.8 or less. The ratio D1/D2 can be set as appropriate within the scope of 0.8 or less. For example, it is possible that the outside diameter D1 of the motor 133 be set at 40 mm and the outside diameter D2 of the spool outer periphery 132a of the spool 132 be set at 55 mm. In this case, the ratio D1/D2 is about 0.73. With such a structure, the size of the spool 132 in the radial direction can be reduced to correspond to the size of the motor 133 in the radial direction, thereby enabling the reduction in over-all size relating to the radial direction of the retractor 130.

In addition, the spool 132 according to the present embodiment may define the substantial outer profile of the retractor 130 and form "a seat belt-retractor main body (a retractor housing)" for accommodating major components of the spool, including at least the motor 133. Also, in the present embodiment, the correlation among a volume V1 of the motor housing 133a of the motor 133 (a volume occupied by the motor housing 133a), a volume V2 of the cylindrical space of the spool 132, and an storage volume V3 in the seat belt retractor housing is set so as to satisfy the equation: V3<V1+V2. With the present structure, the volume V2 of the spool 132 substantially coincides with the storage volume V3 in the seat belt retractor housing. Also, the storage volume V3 in the seat belt retractor housing is typically defined as the volume of the inner space of a roll formed by the seat belt in the retracted state. Taking account of the relative volumes of the spool and the motor, the setting range of these volumes is defined as a retractor miniaturization adjustment range effective for miniaturizing the seat belt retractor. More preferably, these volumes are set so as to satisfy the equation: V3<(V1+V2)×N, wherein 0.5<N<1. Also, in order to make sure reduction in the size and weight of the retractor, the N in V3<(V1+V2)×N is further preferably in a range of 0.55<N<0.95, more preferably 0.55<N<0.85, especially preferably 0.55<N<0.75 are applied.

Also, in the present embodiment, the ratio V1/V2 of the volume V1 of the motor housing 133a of the motor 133 (the volume occupied by the motor housing 133a) to the volume V2 of the cylindrical space of the spool 132 may be set in a retractor miniaturization adjustment range with respect to the volume ratio, in which the ratio V1/V2 is 40 percent (about 0.4) or more and is less than 100 percent (about 1).

The retractor miniaturization adjustment range as mentioned above is defined as a range effective for reducing the size of the seat belt retractor 130, taking the volumes relative to the spool 132 and the motor of this embodiment into consideration. Specifically, as shown in FIG. 2, the size of the retractor 130 in the width direction is broadly equal to the size L1 of the motor housing 133a in the axial direction and the size L2 of the spool outer periphery 132a of the spool 132 in the width direction. Therefore, by suitably setting the relative sizes of the spool 132 and the motor 133 in the radial direction, the relationship among the respective volumes corresponding to the retractor miniaturization adjustment range may be substantially set. According to this structure, the miniaturization of the retractor is achieved. The seat belt retractor 130 having the aforementioned dimensional structure according to this embodiment can be accommodated in a relatively narrow area of a vehicle part for the purpose of use by a passenger in a rear seat of a sedan-type automobile. Though the seat belt retractor 130 has reduced size for the passenger in the rear seat, the seat belt retractor 130 can be, of course, accommodated in the vehicle for the purpose of use by a driver or a passenger in a front seat.

The motor 133 according to the present embodiment is a electric motor, a so-called "brushless motor of inner rotor type". The motor 133 may use a magnet as a rotor and a coil as a stator which are accommodated in the motor housing 133a. The stator is disposed around the rotor. The motor 133 may be structured such that the motor shaft is rotated according to the rotation of the rotor. Also, the motor 133 may have a hall sensor (magnetic position detector) 134 placed on the side of the motor housing 133a and the magnetic disc 135 placed on the side of the rotor. With collaboration of the hall sensor 134 and the magnetic disc 135, the position of the rotor may be detected, the amount of winding off or retraction of the seat belt 110 may be obtained from the detected information, and based on the amount of winding off and retraction of the seat belt 110, the rotational speed of the motor and the load of the motor can be controlled. As described above, in the present embodiment, the hall sensor 134 and the magnetic disc 135 as "position-detecting means" of the rotor of the motor 133 also serve as a means for detecting the amount of winding off or retraction of the seat belt 110. Accordingly, the use of the brushless motor having a structure similar to that of the motor 133 can eliminate special sensors and the like for detecting the rotational speed and a rotational direction of the rotor, and the amount of winding off or retracting the seat belt 110, and so forth, thereby reducing the size and weight of the retractor and also, resulting in a rational technique. Also, the brushless motor having the structure as that of the motor 133 is effective for miniaturizing the size of the body of the motor, and improving output and heat radiation properties.

As shown in FIGS. 2 and 3, the motor shaft of the motor 133 is adapted to have the sun gear 138. Three planetary gears 137 mesh with the outer periphery of the sun gear 138. The outer peripheries of the planetary gears 137 mesh with inner periphery of the internal gear 136. That is, a gear train, a so-called "planetary gear mechanism" is constructed in which the planetary gears 137 are arranged between the internal gear 136 and the sun gear 138. The internal gear 136 may be fixed to the base frame 131. The planetary gears 137 may be rotatably supported by the carrier 139 and the spool 132 may be connected to the carrier 139. The internal gear 136, the planetary gears 137, and the sun gear 138 may together form a speed-reduction mechanism (corresponding to the "motor speed-reduction mechanism" of the present invention) of the motor 133. In the present embodiment, the motor speed-reduction mechanism may be located adjacent to the motor housing 133a relative to the axial direction of the motor housing 133a. Further in the present embodiment, the plural gears that form the motor speed-reduction mechanism may be arranged to extend on the same plane in a direction perpendicular to the axial direction of the shaft of the motor. According to this structure, the size relating to the axial direction of the motor speed-reduction mechanism can be reduced by arrangement of the plural gears, thereby further reducing the overall size relating to the axial direction of the retractor 130, including the motor speed-reduction mechanism. Therefore, the reduction in size of the retractor 130 and the seat belt apparatus 100 to be installed in the vehicle may be achieved.

Also, in the present embodiment, the three dimensions, i.e. the first size relating to the width direction of the spool outer periphery 132a, the second size which is the size relating to the axial direction of the motor housing 133a plus the size relating to the axial direction of the motor speed-reduction mechanism, and the width of the seat belt 110 may be broadly equal to each other. That is, in the present embodiment, the first size and the second size may be set to correspond to the standard width of the seat belt 110. As shown in FIG. 2, in the present embodiment, the overall size of the spool 132 in the width direction may be nearly equal to the size of the spool outer periphery 132a in the width direction. That is, the four dimensions, i.e. the overall size of the spool 132 in the width direction, the first size, the second size, and the width of the seat belt 110 may be broadly equal to each other. According to this structure, the width of the spool 132 can be reduced to correspond to the size of the combination of the motor housing 133a with the motor speed-reduction mechanism in the axial direction, thereby reducing the overall size relating to the axial direction of the seat belt retractor.

Also, in the present embodiment, the driving shaft (the motor shaft) as the rotational axis of the motor 133, the spool shaft as the rotational axis of the spool 132, and the speed-reduction shaft as the rotational axis of the sun gear 138, as one component of the speed-reduction mechanism, may be generally aligned in a straight line along the width direction of the spool outer periphery 132a. With such a structure, the motor-speed reduction mechanism can be simplified and miniaturized, and in addition, the size relating to the radial direction of the motor 133, the spool 132, and the motor-speed reduction mechanism can be reduced, thereby reducing the size and the weight of the overall retractor.

With the aforementioned structure of the retractor 130, when the motor shaft of the motor 133 rotates, the three planetary gears 137 engaged with the sun gear 138 rotate about the speed reduction shaft (the driving shaft of the motor 133) of the sun gear 138, thereby rotating the spool 132 having the carrier 139 interposed therebetween. For example, in FIG. 3, when the sun gear 138 moves clockwise about the speed reduction shaft, the three planetary gears 137 move around the sun gear 138 in the clockwise direction while rotating counterclockwise on the respective axes in the space between the outer periphery of the sun gear 138 and the inner periphery of the internal gear 136. On the contrary, when the sun gear 138 rotates counterclockwise about the speed reduction shaft, the three planetary gears 137 move around the sun gear 138 in the counterclockwise direction while rotating clockwise on the respective axes in the space between the outer periphery of the sun gear 138 and the inner periphery of the internal gear 136. On this occasion, the rotation of the motor 133 is transmitted to the spool 132 while the rotation of the motor 133 is reduced to some fraction of the rotational speed of the motor and its torque is contrarily increased. With the rotating force transferred to the spool 132, the seat belt 110 is retracted around or wounded off from the outer periphery of the spool 132. With such a structure, the motor-speed reduction mechanism can be simplified, thereby reducing the size and weight of the overall retractor.

In the seat belt apparatus 100 having the above-described structure, the control of the operation of the motor 133 of the retractor 130 may be used when the constraint of the vehicle passenger is conducted or when the constraint of the vehicle passenger is cancelled. The control may be suitably conducted by the ECU 150 based on the input signals from the input element 170 shown in FIG. 1. That is, the seat belt apparatus 100 of this embodiment has such a function that, based on the input signals from the input element 170, the ECU 150 controls the operation of the motor 133 to adjust the tension of the seat belt 110 so as to control the condition about the constraint of the vehicle passenger and therefore forms an occupant constraining system for a vehicle. Specifically, the following first through fifth modes may be employed.

Figure 4:
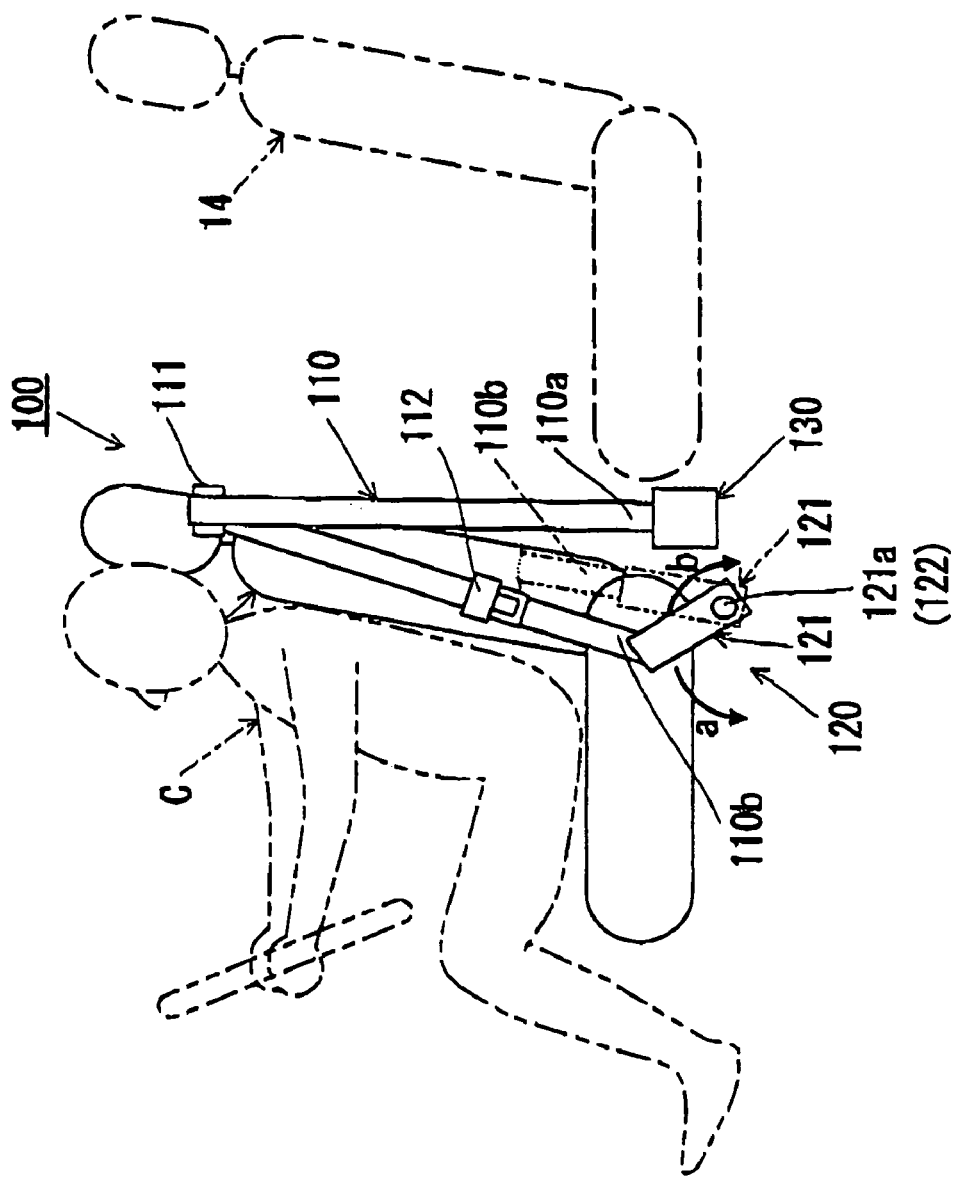
FIG. 4 illustrates a state of an out-anchor apparatus of the seat belt apparatus according to the present embodiment, upon an operation of a front-seat passenger for wearing the seat belt.

As a first mode (a seat belt-putting-on mode), when a vehicle passenger C sitting in the front vehicle seat 10 inserts and latches the tongue 112 to the buckle 116 of the seat belt 110, the motor 133 may be controlled to rotate in the belt-winding-off direction so as to allow the vehicle passenger C to easily withdraw the seat belt 110. FIG. 4 illustrates a state of the seat belt apparatus 100 according to the present embodiment "upon putting-on the seat belt by a front-seat passenger". This state may be reached upon detecting that the vehicle passenger C gets in the vehicle. Meanwhile, the detection may be carried out with a passenger-detecting sensor (not shown) disposed on a door switch or the seat. To be specific, when the passenger-detecting sensor detects that the door for the vehicle passenger C to get in or out of the vehicle is closed from its opened stated, it is determined that the vehicle passenger C gets in the vehicle, and also, when the passenger-detecting sensor detects that the vehicle passenger C sits in the vehicle seat 10, it is determined that the vehicle passenger C is sitting in the seat.

When the fact that the vehicle passenger C gets in the vehicle is detected, the motor 133 may be controlled in the belt-winding-off direction so that a tension exerted on the front-end 110b of the seat belt 110 is reduced (weakened). On this occasion, as shown in FIG. 4, the turning member 121 of the out-anchor apparatus 120 may turn frontward in relation to the vehicle (as indicated by the direction of arrow a) about the turning fulcrum 121a. That is, the turning member 121 turns about the turning fulcrum 121a from a "seat belt-retracting position" shown by a two-dotted-chain line in FIG. 4 to a "seat belt-putting-on position" shown by a solid line in FIG. 4, with the turning being caused by the elastic urging force of the twisted spring 122 in the direction of arrow a and the weight of the tongue 112. On this occasion, the driving mechanism of the motor 133 and the turning mechanism of the turning member 121 serve as a means for moving the front-end 110b of the seat belt 110 between the seat belt-retracting position and the seat belt-putting-on position and constitute the "driving means" in the present invention.

With the turning operation of the turning member 121 towards the front of the vehicle as described above, when a front-seat passenger wears the seat belt, the tongue 112 and the front-end 110b of the seat belt 110 move in a closer-to-passenger direction, coming closer to the vehicle passenger C sitting in the front vehicle seat 10, and is set at the seat belt-putting-on position (corresponding to the "first setting position" in the present invention) shown by the solid line in FIG. 4. That is, the front-end 110b of the seat belt 110 lies closer to the vicinity of the waist of the vehicle passenger C at the solid line position in the figure than at the two-dotted-chain line position in the figure. The seat belt-putting-on position may be located further forward of the front side of the vehicle than the retractor 130. When the vehicle passenger C gets in the car and wears the seat belt 110, the vehicle passenger C may easily grasp the seat belt 110 and the tongue 112 at the seat belt putting-on position, which helps the vehicle passenger C to put on the seat belt, thereby reducing a load and an operation for withdrawing the seat belt.

Also, as a second mode (a fitting mode), the motor 133 is controlled to rotate in the belt retracting direction to apply a predetermined tension on the seat belt in the state that the seat belt 110 is worn by the vehicle passenger. Accordingly, slack of the seat belt generated when the seat belt is withdrawn can be eliminated. If necessary, the motor 133 may be controlled to rotate a little in the belt retracting direction or the belt winding-off direction to conduct fine adjustment for controlling comfort of the vehicle passenger wearing the seat belt.

Also, as a third mode (a pre-rewinding (constraining) mode), the motor 133 may be controlled to rotate in the belt retracting direction to apply strong tension on the seat belt 110 when the seat belt is worn by the vehicle passenger. Accordingly, a change in the posture of the vehicle passenger due to a vehicle collision or emergency braking is inhibited so as to ensure the protection of the vehicle passenger.

Also, as a fourth mode (a warning mode), when a danger or a collision is predicted in the state while the seat belt 110 is being used, the motor 133 may be controlled to rotate in the belt retracting direction or the belt winding-off direction to change tension on the seat belt so as to urge the vehicle passenger to pay attention. For example, the operation of applying strong tension and weak tension onto the seat belt 110 may be repeated, thereby preventing the vehicle passenger from dozing and thus aiding in the prevention of a collision.

For example, the seat belt retractor can be adapted to control the seat belt to alert the passenger when the apparatus detects that a driver of the vehicle is not alert. In another example, a control unit can be adapted to detect that the driver of the vehicle is not alert, which then signals the seat belt retractor to control the seat belt to alert the passenger.

Figure 5:
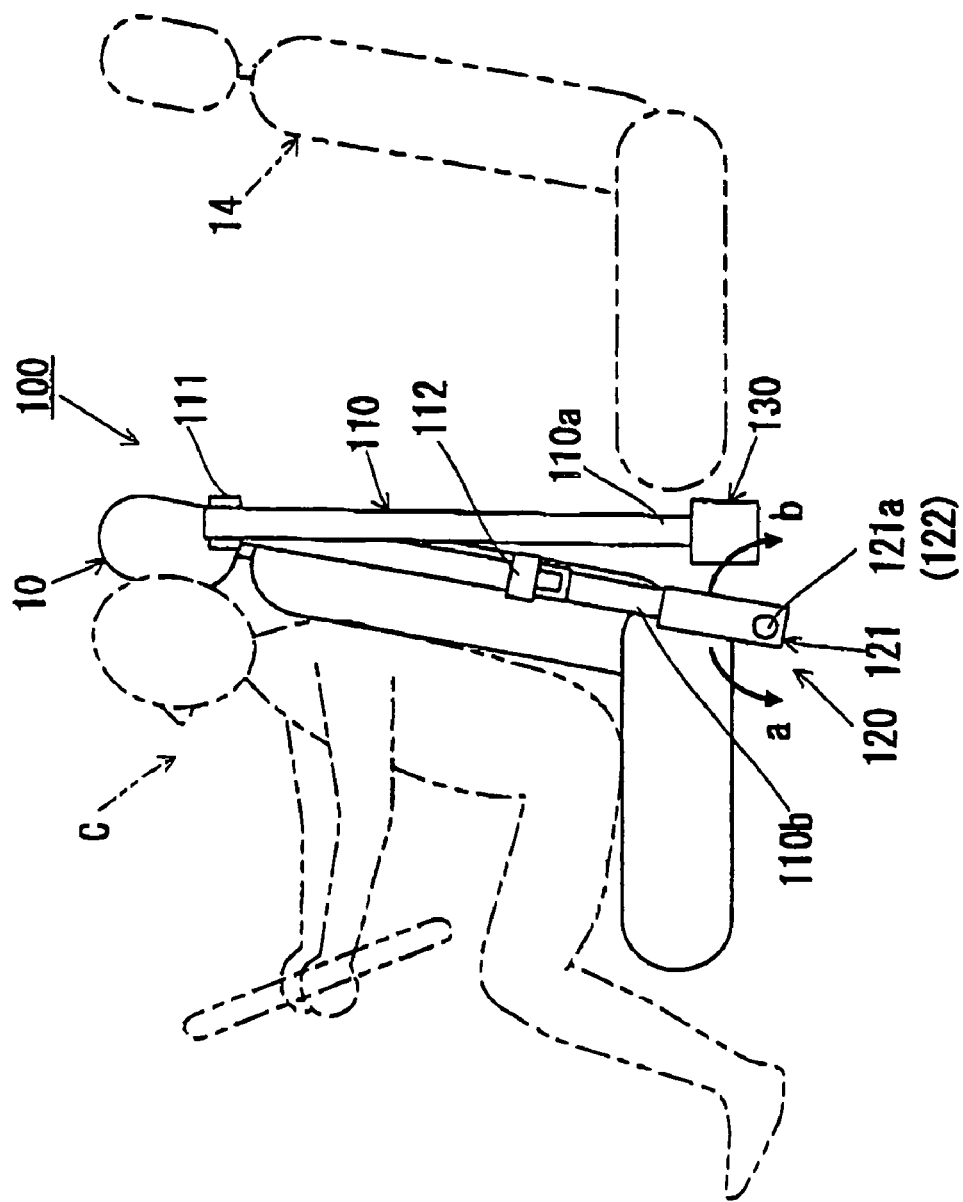
FIG. 5 illustrates a state of the out-anchor apparatus of the seat belt apparatus according to the present embodiment, upon retracting the seat belt.

Also, as a fifth mode (a seat belt-storing mode), the motor 133 may be controlled to rotate in the belt retracting direction to facilitate the vehicle passenger C to store the seat belt 110 after the vehicle passenger releases the latching of the tongue 112 from the buckle 116. FIG. 5 illustrates a state of the seat belt apparatus 100 according to the present embodiment, "upon storing the seat belt". This state may be formed when the fact is detected that the vehicle passenger C has stopped wearing the seat belt. Meanwhile, the detection may be carried out with a detection sensor (not shown) disposed on the buckle 116. To be specific, when the detection sensor detects that the tongue 112 is detached from the buckle 116, it may be determined that the vehicle passenger C has stopped wearing the seat belt 110.

When the fact that the vehicle passenger C has stopped wearing the seat belt 110 is detected, the motor 133 may be controlled to rotate in the belt-retracting direction, so that the tension exerting on the front-end 110b of the seat belt 110 is increased (strengthened). On this occasion, as shown in FIG. 5, the turning member 121 of the out-anchor apparatus 120 turns rearwards (arrow b direction) about the turning fulcrum 121a. That is, the turning member 121 turns about the turning fulcrum 121a to a "seat belt-retracting position" shown by a solid line in FIG. 5, against the elastic urging force of the twisted spring 122 in arrow a direction, to a "seat belt-storing position" shown by a solid line in FIG. 5.

With the turning operation of the turning member 121 rearward of the vehicle as described above, upon storing the seat belt, the tongue 112 and the front-end 110b of the seat belt 110 move in a remoter-from-passenger direction, moving away from the vehicle passenger C sitting in the front vehicle seat 10, and are set at the seat belt-storing position (corresponding to the "second setting position" in the present invention) shown by a solid line in FIG. 5. That is, the front-end 110b lies remoter from the vicinity of the waist of the vehicle passenger C at the solid line position in FIG. 5 than at the solid line position in FIG. 4. Since the seat belt-storing position is located further forwards of the front side of the vehicle than the retractor 130, the seat belt 110 is smoothly stored and also, the vehicle passenger C easily gets in or out of the vehicle. With this, a load and an operation upon storing the seat belt are reduced and also, the vehicle passenger easily gets in or out of the vehicle.

As described above, the seat belt apparatus 100 according to the present embodiment may be constructed such that the front-end 110b of the seat belt 110 is set at the first setting position close to the vehicle passenger upon storing the seat belt and at the second setting position remote from the vehicle passenger upon putting on the seat belt, whereby the front-seat passenger smoothly gets in or out of the vehicle.

Particularly, in the seat belt apparatus 100 according to the present embodiment, the turning structure of the turning member 121 disposed in the lower region in the vehicle, located lower than the seating surface of vehicle seat 10, can eliminate the driving mechanism at the upper position of the B-pillar. According to the structure, the seat belt does not move at the upper position of the B-pillar, thereby ensuring constraint of the passenger upon putting on the seat belt and improving a design feature in the vehicle compartment.

Also, in the seat belt apparatus 100 according to the present embodiment, the turning structure of the turning member 121 can simplify a mechanism for moving the front-end 110b of the seat belt in the back and forth direction of the vehicle. In addition, by using the twisted spring 122 to elastically urge the turning member 121, the driving means for moving the front-end 110b of the seat belt serves also as the motor 133 for retracting and winding off the seat belt 110, thereby providing a rational technique. Meanwhile, in the present invention, in place of the structure in the present embodiment as described above, in which the turning member 121 turns in accordance with a collaborative operation of the twisted spring 122 and the motor 133, driving means for independently driving the turning member 121 may be provided.

The present invention is not limited only to the foregoing embodiment and a variety of modifications and variations are possible. For example, each of the following embodiments obtained by modifying the foregoing embodiment can be implemented.

Figure 6:
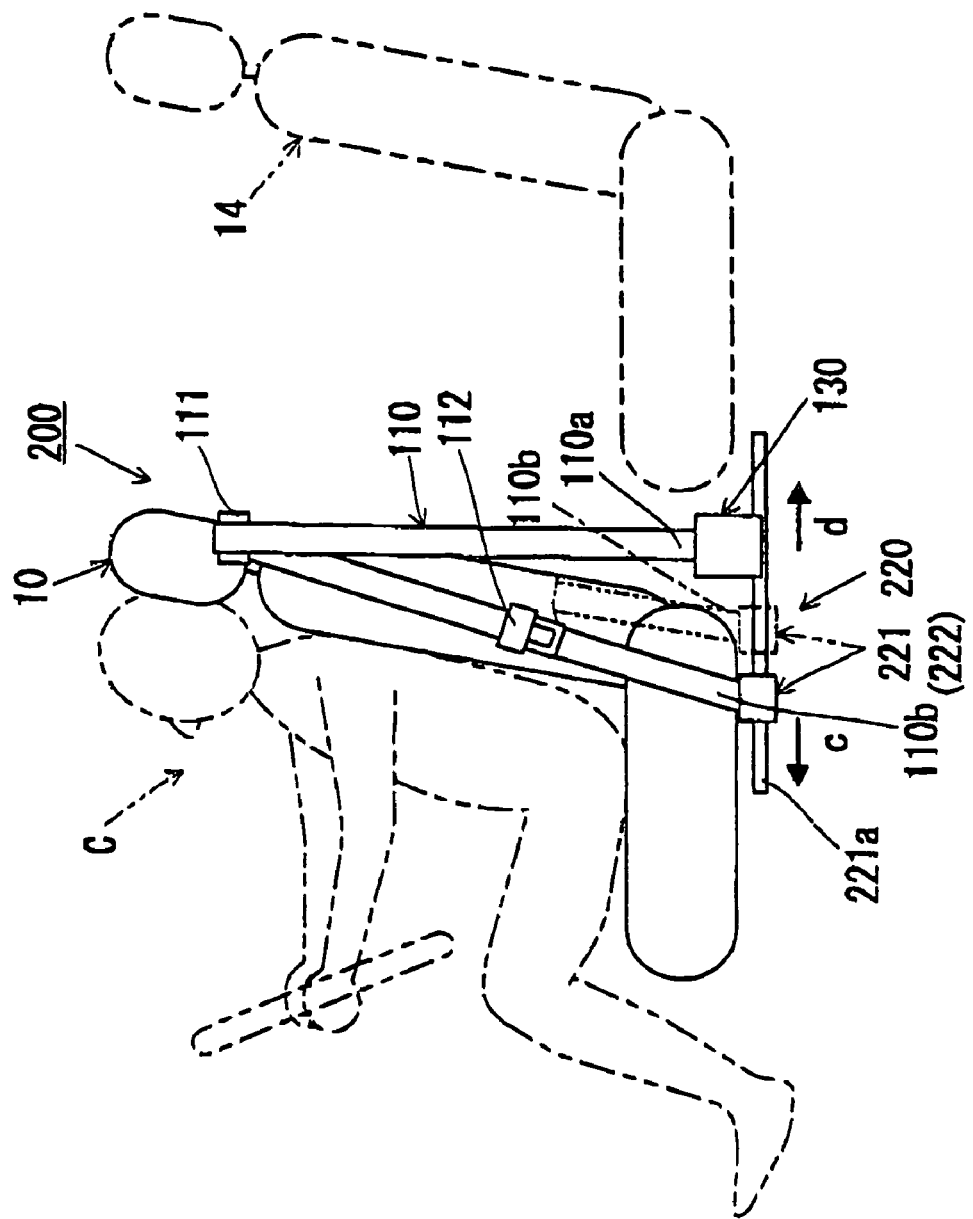
FIG. 6 illustrates a state of an out-anchor apparatus of a seat belt apparatus according to another embodiment, upon the front-seat passenger wearing the seat belt.
Figure 7:
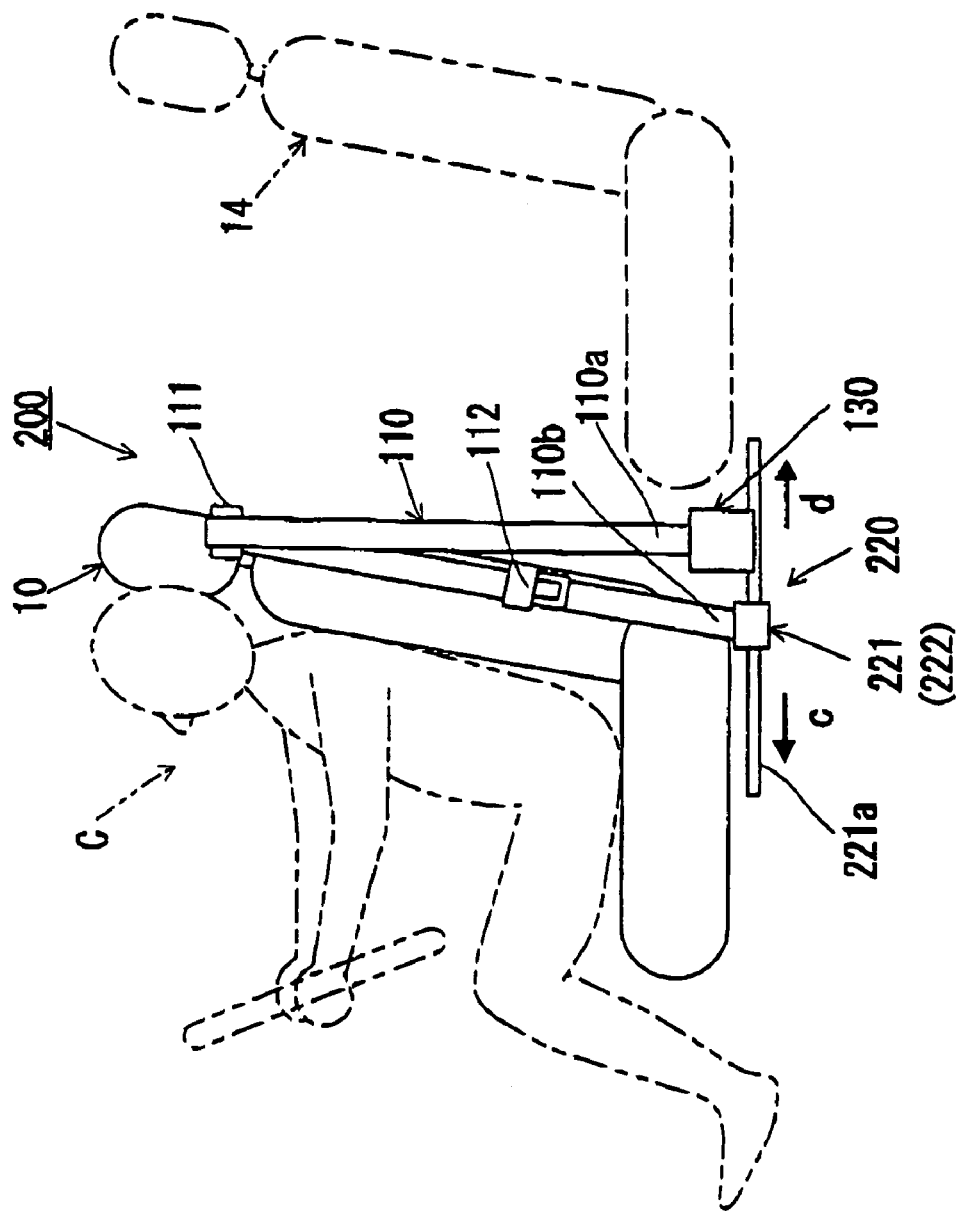
FIG. 7 illustrates a state of the out-anchor apparatus of the seat belt apparatus according to the other embodiment, upon retracting the seat belt.
Figure 8:
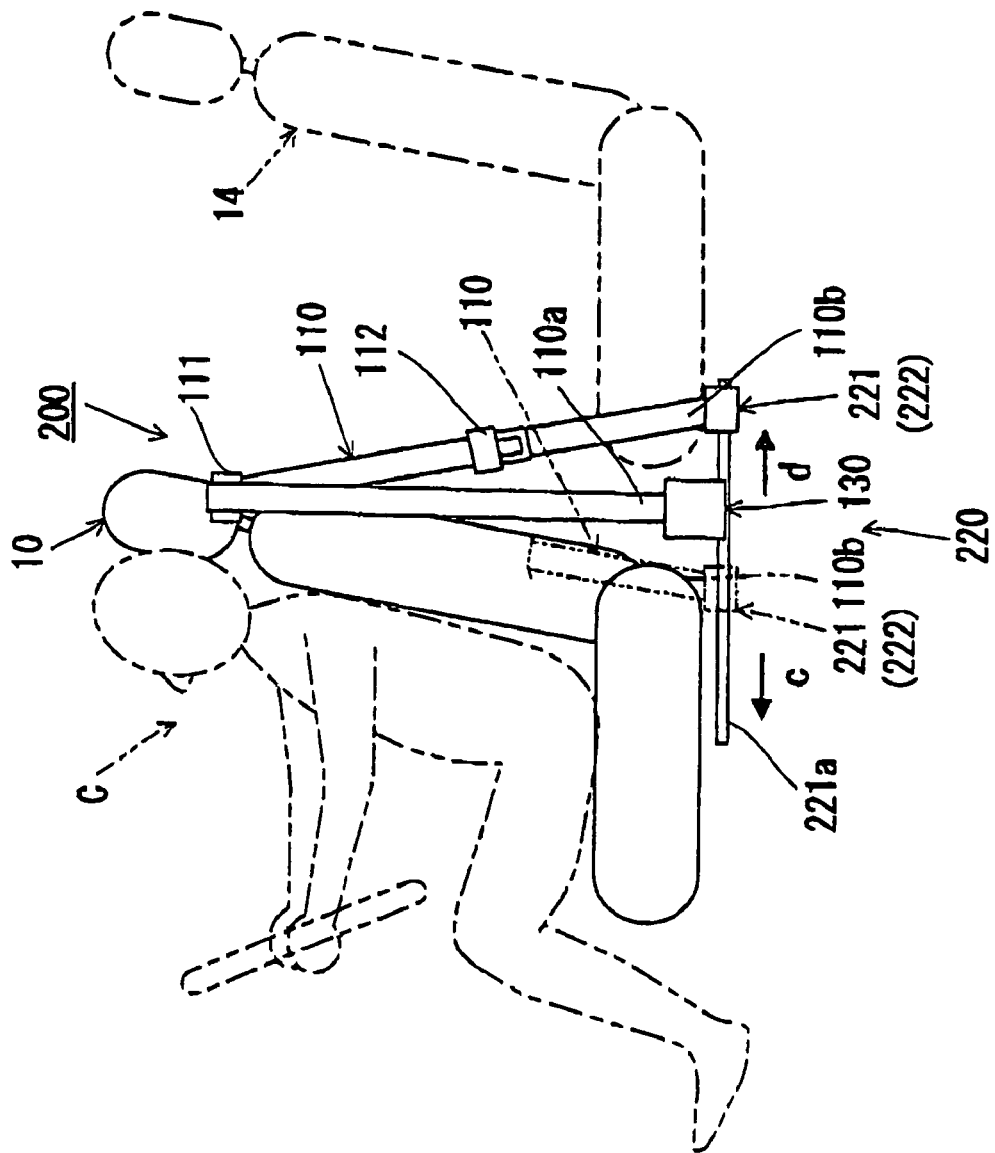
FIG. 8 illustrates a state of the out-anchor apparatus of the seat belt apparatus according to the other embodiment, when a rear-seat passenger gets in or out of a vehicle.

While the turning member 121 of the out-anchor apparatus 120 turns in the seat belt apparatus 100 according to the foregoing embodiment, the out-anchor apparatus 120 may be formed differently. Referring now to FIGS. 6 to 8, the structure and an operation of an out-anchoring apparatus 220 of a seat belt apparatus 200 according to another embodiment will be described. FIGS. 6, 7 and 8 illustrate states of the out-anchor apparatus 220, respectively, "upon an operation of putting on the seat belt by a front-seat passenger" and "upon storing the seat belt", and "upon an operation of getting in-out of the vehicle" by a rear-seat passenger. Meanwhile, since the structure other than the out-anchoring apparatus 220 is the same as that of the seat belt apparatus 100, the description thereof will be omitted.

In the seat belt apparatus 200 shown in FIG. 6, the front-end 110b of the seat belt 110 withdrawn from the retractor 130 is fixed to the vehicle body by the out-anchoring apparatus 220 disposed lower than the seating surface of the vehicle seat 10. Also, the out-anchoring apparatus 220 includes a sliding member 221. The sliding member 221 has a function of fixing the front-end 110b to the vehicle body in the lower region in the vehicle lower than the seating surface of the vehicle seat 10 and corresponds to the "anchor member" in the present invention. Also, the sliding member 221 may be fixed to the side of the vehicle body and formed so as to slide on a sliding rail 221a extending long in the back and forth direction of the vehicle, frontward of the vehicle (in the direction indicated by arrow c in FIG. 6) and rearward of the vehicle (in the direction indicated by arrow d in FIG. 6). The sliding member 221 may slide on the sliding rail 221a with the aid of a driving unit 222 such as a motor.

In addition to the first to fifth modes in the seat belt apparatus 100, the seat belt apparatus 200 further achieves a sixth mode with the aid of a control of the ECU 150. Since its operations in the first mode, the fifth mode, and the sixth mode of these modes are different from those in the seat belt apparatus 100, only the operations in the first mode, the fifth mode, and the sixth mode will be described.

As the first mode (the seat belt-putting-on mode), when a vehicle passenger C sitting in the front vehicle seat 10 holds the tongue 112 to latch the tongue 112 into the buckle 116 of the seat belt, the motor 133 is controlled to rotate in the belt-winding-off direction such that the vehicle passenger C easily can withdraw the seat belt 110, and also, the driving unit 222 is controlled such that the sliding member 221 moves frontward of the vehicle. A state of the seat belt apparatus 200 "upon an operation of putting on the seat belt by the front-seat passenger" shown in FIG. 6 may be reached when the fact that the vehicle passenger C gets in the vehicle is detected. Meanwhile, the detection may be carried out with a passenger-detecting sensor (not shown) disposed on a door switch or the seat in the same fashion as in the seat belt apparatus 100.

When the fact that the vehicle passenger C gets in the vehicle is detected, the operation of the motor 133 may be controlled in the belt-winding-off direction, and the tension exerted on the front-end 110b of the seat belt 110 may be reduced (weakened). Also, by controlling the driving unit 222, the sliding member 221 may slide on the sliding rail 221a in the direction indicated by arrow c in the figure, from a "seat belt-storing position" shown by a two-dotted-chain line in FIG. 6 to a "seat belt-putting on position" shown by a solid line in FIG. 6. On this occasion, the driving mechanism of the motor 133 and the sliding mechanism of the sliding member 221 serve as means for moving the front-end 110b of the seat belt 110 between the seat belt-storing position and the seat belt-putting on position and constitutes the "driving means" in the present invention.

With the sliding operation of the sliding member 221 to the front of the vehicle as described above, upon an operation of putting on the seat belt by the front-seat passenger, the tongue 112 and the front-end 110b of the seat belt 110 may move in a closer-to-passenger direction, coming closer to the vehicle passenger C sitting in the front vehicle seat 10, and are set at the seat belt-putting on position (corresponding to the "first setting position" in the present invention) shown by the solid line in FIG. 6. That is, the front-end 110b lies closer to the vicinity of the waist of the vehicle passenger C at the solid line position shown in the figure than at the two dotted line chain position. Since the seat belt-putting on position is closer to the front side of the vehicle than to the retractor 130, when the vehicle passenger C gets in the vehicle and wears the seat belt 110, the vehicle passenger C easily grasps the seat belt 110 and the tongue 112. This helps the vehicle passenger C to put on the seat belt, thereby reducing a load and simplifying an operation for withdrawing the seat belt.

Also, as the fifth mode (the seat belt storing mode), when the vehicle passenger C detaches the tongue 112 from the buckle 116, the operation of the motor 133 may be controlled in the belt-retracting direction such that the vehicle passenger C can easily retract the seat belt 110, and also, the driving unit 222 may be controlled such that the sliding member 221 can move rearward of the vehicle. When the fact that the vehicle passenger C stops wearing the seat belt 110 is detected, a state of the seat belt apparatus 200 according to the present embodiment "upon storing the seat belt" shown in FIG. 7 is reached. Meanwhile, the detection is carried out with a detection sensor (not shown) disposed on the buckle 116, in the same fashion as in the seat belt apparatus 100.

When the fact that the vehicle passenger C stops wearing the seat belt 110 is detected, the motor 133 may be controlled to rotate in the belt-retracting direction, and a tension exerting on the front-end 110*b* of the seat belt 110 is increased (strengthened). Also, by controlling the driving unit 222, the sliding member 221 may slide on the sliding rail 221*a* in the direction indicated by arrow d in the figure, from the "seat belt-putting on position" shown by the solid line in FIG. 6 to a "seat belt-storing position" shown by the solid line in FIG. 7.

With the sliding operation of the sliding member 221 rearward of the vehicle as described above, upon storing the seat belt, the tongue 112 and the front-end 110*b* of the seat belt 110 move in the remoter-from-passenger direction, moving away from the vehicle passenger C sitting in the front vehicle seat 10, and are set at the seat belt-storing position (corresponding to the "second setting position" in the present invention) shown by the solid line in FIG. 7. That is, the front-end 110*b* lies remoter from the vicinity of the waist of the vehicle passenger C at the solid line position in FIG. 7 than at the solid line position in FIG. 6. The seat belt-storing position is located closer to the front side of the vehicle than to the retractor 130, where the seat belt 110 is smoothly retracted and also, the vehicle passenger C easily gets in or out of the vehicle. With this, a load and an operation upon storing the seat belt can be reduced and the vehicle passenger easily gets in or out of the vehicle.

In addition, as the sixth mode (a mode of the rear-seat passenger getting in or out of the vehicle), when the rear-seat passenger gets in the vehicle for sitting in the rear vehicle seat 14, the motor 133 may be controlled to rotate in the belt-winding-off direction, and also, the driving unit 222 is controlled such that the sliding member 221 moves rearward of the vehicle. When the fact that the rear-seat passenger gets in the vehicle of a coupe-type is detected, a state of the seat belt apparatus 200 according to the present embodiment "upon an operation of getting in or out of the vehicle by the rear-seat passenger" shown in FIG. 8 is formed. Meanwhile, the detection may be carried out with a detection sensor (not shown), for example, that detects that the front vehicle seat 10 is slid frontward of the vehicle or a seatback is reclined frontward of the vehicle.

Upon detecting the fact that the rear-seat passenger gets in the vehicle, the motor 133 may be controlled to rotate in the belt-winding-off direction and the tension exerting on the front-end 110*b* of the seat belt 110 is reduced (weakened).

Also, by controlling the driving unit 222, the sliding member 221 may slide on the sliding rail 221*a* in the direction indicated by arrow d in the figure, from a "seat belt-storing position" shown by a two-dotted-chain line in FIG. 8 to a "position of the rear-seat passenger for getting in or out of the vehicle" shown by a solid line in FIG. 8.

With the sliding operation of the sliding member 221 rearward of the vehicle as described above, upon the operation of getting in or out of the vehicle by the rear-seat passenger, the tongue 112 and the front-end 110*b* of the seat belt 110 move in the remoter-from-passenger direction, moving away from the vehicle passenger C sitting in the front vehicle seat 10, and are set at the position of the rear-seat passenger for getting in or out of the vehicle (corresponding to the "third setting position" in the present invention) shown by the solid line in FIG. 8. That is, the front-end 110*b* lies remoter from the vicinity of the waist of the vehicle passenger C at the solid line position in the figure than at the two-dotted-line position. Since the position of the rear-seat passenger for getting in or out of the vehicle is located closer to the rear side of the vehicle than to the retractor 130, the rear-seat passenger easily gets in or out of the vehicle while passing through a space between the front vehicle seat 10 and the rear vehicle seat 14. With this, the rear-seat passenger easily gets in or out of the vehicle.

As described above, the out-anchoring apparatus 220 according to the present embodiment may have a structure in which the sliding member 221 slides between the first and third setting positions having the second setting position interposed therebetween. Meanwhile, the sixth mode (the mode of the rear-seat passenger getting in or out of the vehicle) may be set if needed and may be omitted according to the circumstances.

As described above, with the structure of the seat belt apparatus 200 according to the present embodiment, the front-end 110*b* of the seat belt 110 may be set at the first setting position close to the vehicle passenger upon wearing the seat belt and at the second setting position remote from the vehicle passenger upon retracting the seat belt, thereby allowing the front-seat passenger to smoothly get in or out of the vehicle. In addition, the front-end 110*b* may be set at the third setting position upon an operation of getting in or out of the vehicle by the rear-seat passenger, whereby the rear-seat passenger can smoothly get in or out of the vehicle.

Particularly, the structure of the seat belt apparatus 200 according to the present embodiment, in which the sliding member 221 disposed in the lower region in the vehicle lower than the seating surface of the vehicle seat 10 slides, eliminates a need for disposing the driving mechanism at the upper position of the B-pillar and also does not require the seat belt moving at the upper position of the B-pillar, thereby achieving constraint of the passenger upon wearing the seat belt and improving a design feature in the vehicle compartment.

Also, in the seat belt apparatus 200 according to the present embodiment, the sliding structure of the sliding member 221 achieves a large moving amount of the front-end 110*b* in the back and forth direction of the vehicle.

While the front-end 110*b* in the seat belt apparatuses 100 and 200 according to the foregoing embodiments comes close to or away from the vehicle passenger when moving along the back and forth direction of the vehicle, the moving direction of the front-end 110*b* can be set where needed. For example, the front-end 110*b* can be arranged so as to move in a direction intersecting with the back and forth direction of the vehicle.

Also, while the mechanism for turning the turning member 121 has the seat belt front-end 110*b* fixed thereto is used in the seat belt apparatus 100 according to the foregoing embodiment, the other mechanism for sliding the sliding member 221 has the seat belt front-end 110b fixed thereto is used in the seat belt apparatus 200 according to the foregoing embodiment. According to the present invention, with respect to an operation of a member having the seat belt front-end 110b fixed thereto, a mechanism having a combined turning and sliding operation may also used.

Though, in the seat belt apparatuses 100 and 200 according to the foregoing embodiments, the retractor 130 is described for the vehicle passenger sitting in a driver seat and is accommodated in an accommodation space within the B-pillar, the present invention is also applicable to the structures of retractors for vehicle passengers sitting in a front-passenger's seat and rear seats of a vehicle. When the structure of a retractor according to the present invention is used for vehicle passengers sitting in the rear seats, the retractor is accommodated in an accommodation space within a C-pillar in an automobile of a type having two rows of seats, or within a C-pillar and a D-pillar in an automobile of a type having three rows of seats. The accommodation spaces in the C-pillar and D-pillar is often limited in the back and forth direction of the vehicle. Especially in such case, a retractor having reduced size in the width direction like the retractor 130 according to the present embodiment is effective.

While the retractor 130 is accommodated in the accommodation space located within the vehicle pillar and in the lower region in the vehicle in the seat belt apparatuses 100 and 200 according to the foregoing embodiments, according to the present invention the retractor may also be accommodated in accommodation spaces other than those within the vehicle pillars, such as spaces located from the lower to upper parts of the vehicle. For example, a vehicle seat such as a front driver seat, a front passenger seat at the front row, or passenger seats behind of the front seats may be provided with an accommodation space inside thereof and the retractors 130 according to the present embodiment may be accommodated in the respective accommodation spaces. The size of the seat is often limited in the longitudinal direction of the vehicle similarly to the vehicle pillars. Especially in this case, a retractor having a reduced size in the width direction like the retractor 130 according to the present embodiment is effective.

Also, while each of the seat belt apparatuses 100 and 200 according to the foregoing embodiments has a structure in which the retractor 130 of a motor built-in type, which has the motor 133 built-in the base frame 131, the present invention can be adopted to a motor retractor that has a structure other than that of a motor-built-in motor retractor. For example, in place of the motor-built-in motor retractor, a motor retractor of a motor externally attached type including a single or plurality (typically two) of power transmission paths may be adopted if needed.

While the structures of the seat belt apparatuses placed in an automobile have been described in the seat belt apparatuses 100 and 200 according to the foregoing embodiments, the present invention is applicable to the structures of seat belt apparatuses placed in vehicles such as an airplane, a ship, and an electric train, as well as the automobile.

The priority application, Japanese Patent Application No. 2004-353152 filed Dec. 6, 2004, including the specification, drawings, claims and abstract, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt apparatus, comprising:
   a seat belt to be worn by a vehicle passenger sitting in a seat;
   a seat belt retractor for retracting and winding off the seat belt;
   a guide member guiding the seat belt wound off from the seat belt retractor so as to be deflected downwards from an upper region in a vehicle, located higher than the seat belt retractor;
   an anchor member fixing a front-end of the seat belt that is guided by the guide member to a vehicle body side in a lower region in the vehicle, located lower than a seating surface of the seat; and
   a driving device for moving the seat belt front-end between a first setting position close to the vehicle passenger and a second setting position remote from the vehicle passenger,
   wherein, when the seat belt is to be worn, the seat belt front-end is set at the first setting position by the driving device, and when the seatbelt is stored, the seat belt front-end is set at the second setting position by the driving device,
   wherein the driving device includes the seat belt retractor,
   wherein the seat belt retractor is adapted to perform a seat belt retracting operation when the seat belt is stored, thereby causing the anchor member to move toward a rear end of the vehicle and set the seat belt front-end at the second setting position.

2. The seat belt apparatus of claim 1, wherein the driving device includes a turning mechanism allowing the anchor member to turn towards a front end and the rear end of the vehicle about a turning fulcrum.

3. The seat belt apparatus of claim 2, wherein, when the seat belt is to be worn, the turning mechanism serves as the driving device to turn the anchor member toward the front end of the vehicle, setting the seat belt front-end at the first setting position, and when the seat belt is stored, the turning mechanism turns the anchor member toward the rear end of the vehicle to set the seat belt front-end at the second position.

4. The seat belt apparatus of claim 3, wherein the driving device includes an urging device configured to urge the anchor member toward a front end of the vehicle.

5. The seat belt apparatus of claim 1, wherein the seat belt retractor is adapted to perform a seat belt winding-off operation to provide slack to the seat belt when a passenger sits in the seat.

6. The seat belt apparatus of claim 5, further comprising a sensor to detect when a passenger enters the vehicle and/or sits in the seat, and wherein the sensor signals the seat belt retractor to perform the seat belt winding-off operation.

7. The seat belt apparatus of claim 1, wherein the seat belt retractor is adapted to perform a seat belt retracting operation to remove slack from the seat belt when the seat belt is to be worn by the passenger.

8. The seat belt apparatus of claim 1, wherein the seat belt retractor is adapted to control the seat belt to maintain posture of the passenger during a collision.

9. The seat belt apparatus of claim 8, further comprising a control unit adapted to detect a vehicle collision, wherein the control unit signals the seat belt retractor to control the seat belt to maintain the posture of the passenger during the collision.

10. The seat belt apparatus of claim 1, wherein the seat belt retractor is adapted to control the seat belt to alert the passenger when the apparatus detects that a driver of the vehicle is not alert.

11. The seat belt apparatus of claim 10, further comprising a control unit adapted to detect that the driver of the vehicle is not alert, wherein the control unit signals the seat belt retractor to control the seat belt to alert the passenger.

12. The seat belt apparatus of claim 1, wherein the driving device includes a turning mechanism allowing the anchor member to turn towards the front and rear sides of the vehicle about a turning fulcrum, wherein the driving device includes an urging device configured to urge the anchor member toward a front end of the vehicle,
  wherein, when the seat belt is to be worn, the turning mechanism serves as the driving device to turn the anchor member toward a front end of the vehicle, setting the seat belt front-end at the first setting position, and when the seat belt is stored, the turning mechanism turns the anchor member toward a rear end of the vehicle to set the seat belt front-end at the second position,
  wherein, when the seat belt is worn, the seat belt retractor performs a seat belt winding-off operation to provide slack to the seat belt, allowing the anchor member to turn toward a front end of the vehicle due to an urging force of the urging device, setting the seat belt front-end at the first setting position, and when the seat belt is stored, the seat belt retractor performs a seat belt retracting operation, causing the anchor member to turn toward a rear end of the vehicle against the urging force of the urging device, setting the seat belt front-end at the second setting position.

13. The seat belt apparatus of claim 1, wherein the seat belt retractor is adapted to perform a seat belt winding-off operation when the seat belt is to be worn, thereby causing the anchor member to move toward a front end of the vehicle and set the seat belt front-end at the first setting position.

14. A seat belt apparatus, comprising:
  a seat belt to be worn by a vehicle passenger sitting in a seat;
  a seat belt retractor for retracting and winding off the seat belt;
  a guide member guiding the seat belt wound off from the seat belt retractor so as to be deflected downwards from an upper region in a vehicle, located higher than the seat belt retractor;
  an anchor member fixing a front-end of the seat belt that is guided by the guide member to a vehicle body side in a lower region in the vehicle, located lower than a seating surface of the seat; and
  a driving device for moving the seat belt front-end between a first setting position close to the vehicle passenger and a second setting position remote from the vehicle passenger, wherein the driving device includes a turning mechanism allowing the anchor member to turn towards the front and rear sides of the vehicle about a turning fulcrum, wherein the driving device includes an urging device configured to urge the anchor member toward a front end of the vehicle,
  wherein, when the seat belt is to be worn, the seat belt front-end is set at the first setting position by the driving device, and when the seatbelt is stored, the seat belt front-end is set at the second setting position by the driving device,
  wherein, when the seat belt is to be worn, the turning mechanism serves as the driving device to turn the anchor member toward a front end of the vehicle, setting the seat belt front-end at the first setting position, and when the seat belt is stored, the turning mechanism turns the anchor member toward a rear end of the vehicle to set the seat belt front-end at the second position,
  wherein the driving device includes the seat belt retractor,
  wherein, when the seat belt is to be worn, the seat belt retractor performs a seat belt winding-off operation to provide slack to the seat belt, allowing the anchor member to turn toward a front end of the vehicle due to an urging force of the urging device, setting the seat belt front-end at the first setting position, and when the seat belt is stored, the seat belt retractor performs a seat belt retracting operation, causing the anchor member to turn toward a rear end of the vehicle against the urging force of the urging device, setting the seat belt front-end at the second setting position.

15. A seat belt apparatus, comprising:
  a seat belt to be worn by a vehicle passenger sitting in a seat;
  a seat belt retractor for retracting and winding off the seat belt;
  a guide member guiding the seat belt wound off from the seat belt retractor so as to be deflected downwards from an upper region in a vehicle, located higher than the seat belt retractor;
  an anchor member fixing a front-end of the seat belt that is guided by the guide member to a vehicle body side in a lower region in the vehicle, located lower than a seating surface of the seat; and
  a driving device for moving the seat belt front-end between a first setting position close to the vehicle passenger and a second setting position remote from the vehicle passenger,
  wherein, when the seat belt is to be worn, the seat belt front-end is set at the first setting position by the driving device, and when the seatbelt is stored, the seat belt front-end is set at the second setting position by the driving device,
  wherein the driving device includes the seat belt retractor,
  wherein the seat belt retractor is adapted to perform a seat belt winding-off operation when the seat belt is to be worn, thereby causing the anchor member to move toward a front end of the vehicle and set the seat belt front-end at the first setting position.

16. A seat belt apparatus, comprising:
  a seat belt to be worn by a vehicle passenger sitting in a seat;
  a seat belt retractor for retracting and winding off the seat belt;
  a guide member guiding the seat belt wound off from the seat belt retractor so as to be deflected downwards from an upper region in a vehicle, located higher than the seat belt retractor;
  an anchor member fixing a front-end of the seat belt that is guided by the guide member to a vehicle body side in a lower region in the vehicle, located lower than a seating surface of the seat; and
  a driving device for moving the seat belt front-end between a first setting position close to the vehicle passenger and a second setting position remote from the vehicle passenger,
  wherein, when the seat belt is to be worn, the seat belt front-end is set at the first setting position by the driving device, and when the seatbelt is stored, the seat belt front-end is set at the second setting position by the driving device,
  wherein the driving device includes the seat belt retractor, wherein the driving device includes a sliding mechanism allowing the anchor member to slide back and forth in regard to a front end and a rear end of the vehicle, wherein the sliding mechanism and seat belt retractor are configured so that when the seat belt is to be worn, the sliding mechanism and the seat belt retractor act to slide the anchor member toward the front end of the vehicle to set the seat belt front-end at the first setting position, and when the seat belt is stored, to slide the anchor member toward the rear end of the vehicle to set the seat belt front-end at the second setting position, wherein the seat belt retractor is disposed in a region between front and rear seats with respect to the back and forth direction of the vehicle, wherein the first and second setting positions are formed closer to the front end of the vehicle than the seat belt retractor, and a third setting position is further formed closer to the rear end of the vehicle than the seat belt retractor, with the seat belt retractor being interposed between the third setting position and the first and second setting positions.

17. The seat belt apparatus of claim 16, wherein the sliding mechanism and the seat belt retractor allow the anchor member to slide between the first setting position and the third setting position, wherein the second setting position is interposed between the first setting position and the third setting position, and wherein, when a front-seat passenger wears the seatbelt, the seat belt front-end is set at the first setting position, wherein upon storage of the seat belt, the seat belt front-end is set at the second setting position, and when a rear-seat passenger gets in or out of the vehicle, the seat belt front-end is set at the third setting position.

18. A seat belt apparatus, comprising:
a seat belt to be worn by a vehicle passenger sitting in a seat;
a seat belt retractor for retracting and winding off the seat belt;
an anchor member fixing a first end of the seat belt to a vehicle body side in a lower region in the vehicle, located lower than a seating surface of the seat; and
wherein the retractor is configured to move the seat belt first end between a first setting position close to the vehicle passenger and a second setting position remote from the vehicle passenger,
wherein, when the seat belt is to be worn, the seat belt first end is set at the first setting position, and when the seatbelt is stored, the seat belt first end is set at the second setting position by the retractor,
wherein the seat belt retractor is adapted to perform a seat belt retracting operation when the seat belt is not worn, thereby causing the anchor member to move toward a rear end of the vehicle and set the seat belt first end at the second setting position.

19. The seat belt apparatus of claim 18, wherein the seat belt retractor is adapted to perform a seat belt winding-off operation when the seat belt is to be worn, thereby causing the anchor member to move toward a front end of the vehicle and set the seat belt front-end at the first setting position.

20. The seat belt apparatus of claim 18, wherein the driving device includes a sliding mechanism allowing the anchor member to slide back and forth in regard to a front end and a rear end of the vehicle,
wherein the sliding mechanism is configured so that when the seat belt is to be worn, the sliding mechanism and the seat belt retractor serve as the driving device to slide the anchor member toward the front end of the vehicle to set the seat belt front-end at the first setting position, and when the seat belt is stored, to slide the anchor member toward the rear end of the vehicle to set the seat belt front-end at the second setting position.

* * * * *

UNITED STATES PATENT AND TRADEMARK OFFICE
CERTIFICATE OF CORRECTION

PATENT NO.       : 7,475,909 B2                                        Page 1 of 1
APPLICATION NO. : 11/274253
DATED            : January 13, 2009
INVENTOR(S)      : Takao et al.

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 448 days Delete the phrase "by 448 days" and insert -- by 506 days --

Signed and Sealed this

Fourth Day of May, 2010

David J. Kappos
*Director of the United States Patent and Trademark Office*